United States Patent
Wilkenhoener et al.

(10) Patent No.: US 7,470,467 B2
(45) Date of Patent: Dec. 30, 2008

(54) SILICA NANOPARTICLES MODIFIED WITH ORGANOMETALLIC COMPOUNDS OF ZIRCONIUM AND/OR TITANIUM

(75) Inventors: Uwe Wilkenhoener, Wuppertal (DE); Martin Wulf, Langenfeld (DE); Paer Winkelmann, Wuppertal (DE)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/509,165

(22) Filed: Aug. 24, 2006

(65) Prior Publication Data

US 2007/0049660 A1    Mar. 1, 2007

Related U.S. Application Data

(60) Provisional application No. 60/711,130, filed on Aug. 25, 2005.

(51) Int. Cl.
 B32B 5/16   (2006.01)
 C04B 24/40  (2006.01)
 C04B 35/04  (2006.01)

(52) U.S. Cl. ............... 428/404; 106/436; 106/438; 106/446; 106/450; 106/481; 428/407; 977/775; 977/779; 977/783

(58) Field of Classification Search ............ 428/403, 428/404, 405, 406, 446; 106/436, 446, 450, 106/481; 977/775, 779, 783
See application file for complete search history.

(56) References Cited

U.S. PATENT DOCUMENTS

| | | | | |
|---|---|---|---|---|
| 3,660,134 A | * | 5/1972 | Morris et al. | 106/445 |
| 4,098,758 A | * | 7/1978 | Monte et al. | 523/215 |
| 5,591,797 A | * | 1/1997 | Barthel et al. | 524/493 |
| 5,674,936 A | * | 10/1997 | Lucas | 524/731 |
| 5,998,536 A | * | 12/1999 | Bertry et al. | 524/557 |
| 6,391,938 B1 | * | 5/2002 | Lilley | 522/182 |
| 6,511,754 B1 | * | 1/2003 | Bohin et al. | 428/447 |
| 6,720,072 B1 | * | 4/2004 | Hinterwaldner et al. | 428/403 |
| 6,750,270 B1 | | 6/2004 | Klostermann et al. | |
| 6,790,904 B2 | | 9/2004 | White et al. | |
| 6,870,064 B2 | * | 3/2005 | Agostini et al. | 556/54 |
| 6,908,692 B1 | * | 6/2005 | Bohm et al. | 428/632 |
| 2002/0098243 A1 | | 7/2002 | Edelmann et al. | |
| 2003/0224174 A1 | | 12/2003 | White et al. | |
| 2004/0242729 A1 | * | 12/2004 | Baran et al. | 523/200 |
| 2005/0241531 A1 | | 11/2005 | Meyer et al. | |
| 2006/0084723 A1 | | 4/2006 | Hartwig et al. | |
| 2006/0251906 A1 | * | 11/2006 | Liao et al. | 428/446 |

FOREIGN PATENT DOCUMENTS

| | | |
|---|---|---|
| DE | 10239424 A1 | 3/2004 |
| DE | 10241510 A1 | 3/2004 |
| EP | 1166283 | 1/2002 |
| EP | 1195416 A2 | 4/2002 |
| EP | 1216278 | 6/2002 |
| WO | WO03102089 | 12/2003 |

* cited by examiner

Primary Examiner—Holly T. Le
(74) Attorney, Agent, or Firm—Sudhir G. Deshmukh

(57) ABSTRACT

The invention relates to modified nanoparticles based on pyrogenic silica which are produced by treating pyrogenic silica with compounds of the general formula I $Me(OR^1)_4$, and/or of the general formula II $Me(OCOR^1)_4$, wherein $R^1$ means an alkyl, aryl and/or aralkyl residue and Me means zirconium and/or titanium and to coating compositions containing the modified nanoparticles.

11 Claims, No Drawings

SILICA NANOPARTICLES MODIFIED WITH ORGANOMETALLIC COMPOUNDS OF ZIRCONIUM AND/OR TITANIUM

CROSS-REFERENCE TO RELATED APPLICATION

This application claims priority under 35 U.S.C. §119 from U.S. Provisional Application Ser. No. 60/711,130, filed Aug. 25, 2005.

FIELD OF THE INVENTION

The invention relates to modified nanoparticles based on pyrogenic silica, to a process for the production of the modified nanoparticles and to coating compositions with improved scratch resistance which contain the modified nanoparticles.

DESCRIPTION OF RELATED ART

Improving the mechanical stability, such as, scratch resistance, hardness and abrasion resistance, of coatings has long been a central task, in particular for automotive top coats. It is known to improve the above-stated properties by incorporating nanoparticles into clear coats or top coats. The technical challenge here is to incorporate the necessary quantity of nanoparticles into the coatings in such a manner that the general range of properties of the coatings remains unaffected. For example, it should be ensured that properties such as, optical quality (transparency in clear coats or colour shade in pigmented coatings), rheology, flow and adhesion are not negatively affected by the use of nanoparticles.

EP 1 216 278, EP 1 195 416 and DE 10239424 describe, for example, differently structured and functionalised nanoparticles and the use thereof in coatings to impart scratch resistance.

WO 03102089 furthermore describes chemically modified nanoparticles, which are present as a dispersion in a film-forming binder. The nanoparticles are here modified by compounds of the general formula $Si(OR)_3-(CH_2)_n-Z$, wherein Z represents a long-chain alkyl group, a fluorocarbon group or a silane group with at least 2 methyl groups. The group Z is intended to ensure that the modified nanoparticles exhibit lower compatibility towards the binders than do the unmodified particles and so preferably congregate at the surface of the coatings containing them.

DE 102 41 510 describes compositions prepared from agglomerated nanoparticle powders and organic binders. The nanoparticles are here treated with compounds of the general formulae $Si(OR')_nR_{4-n}$, $SiCl_nR_{n-4}$, $(R'_mR''_{m-3}Si_2)NH$, $Ti(OR')_nR_{4-n}$ and $Zr(OR')_nR_{4-n}$, wherein R is a functional group which is attached directly via a C atom to the silicon, titanium or zirconium. In particular, the functional groups are those with unsaturated double bonds which, once the nanoparticles have been incorporated into the unsaturated monomers forming the binder, are polymerised with the monomers and give rise to a crosslinked nanocomposite.

EP 1 166 283 describes coating compositions for metallic conductors, in particular wires, which exhibit improved partial discharge resistance and which give rise to flexible coatings on the wires. These compositions contain particles based on an element-oxygen network with reactive and optionally, unreactive functions on the surface, wherein the unreactive functions are attached via the oxygen of the network.

It has not, however, proved possible hitherto to provide nanoparticles or processes for incorporating nanoparticles into coatings which are capable of satisfactorily solving the above-stated technical problem.

There is accordingly still a requirement for nanoparticles which may be incorporated into coatings in a sufficient quantity to achieve improved scratch resistance and hardness without having to make relatively large concessions with regard to other essential coating properties.

SUMMARY OF THE INVENTION

The invention relates to modified nanoparticles based on pyrogenic silica which are produced by treating pyrogenic silica with compounds of the general formula I $Me(OR^1)_4$ and/or the general formula II $Me(OCOR^1)_4$. $R^1$ here means an alkyl, aryl and/or aralkyl residue. Me means zirconium and/or titanium. Me and $R^1$ can be each selected independently in formula I and II.

A preferred embodiment of the present invention starts from nanoparticles based on hydrophobic, silanised pyrogenic silica.

The invention accordingly also relates to modified nanoparticles based on silanised pyrogenic silica which are produced by treating silanised pyrogenic silica with compounds of the general formula I $Me(OR^1)_4$ and/or the general formula II $Me(OCOR^1)_4$. $R^1$ and Me have the above-stated meaning.

It has surprisingly been found that, by using the nanoparticles according to the invention, increased quantities of active nanoparticles may be incorporated into coatings. It has proved possible to achieve a considerable improvement in the dispersion and deagglomeration of the nanoparticles. This results in improved mechanical stability, in particular, improved scratch resistance of the coatings applied from these compositions. The existing advantageous properties of coatings which have not been modified with the nanoparticles are retained. The nanoparticles according to the invention exhibit virtually neutral behaviour in the coating. The effect on the rheological behaviour of the coatings is minimal, the transparency of resultant clear coats is very good, the colour of pigmented coatings is unchanged and the surface structure of the coating is not impaired. There is also no discernible negative influence on the development of hardness.

DETAILED DESCRIPTION OF THE EMBODIMENTS

The invention will be explained in greater detail below.

Pyrogenic silica is here taken to mean highly disperse synthetic silicas which have been produced by flame hydrolysis or with the assistance of the arc process (for definition c.f. also RÖMPP Lexikon, Lacke und Druckfarben [Coatings and Printing Inks], 1998, p. 323). The production of pyrogenic silica is known to the person skilled in the art. Pyrogenic silica is obtainable as a commercial product.

According to the invention, nanoparticles based on pyrogenic silica, preferably based on silanised pyrogenic silica, are modified by treatment with the above-stated zirconium and/or titanium compounds of the general formula I and/or of the general formula II, wherein $R^1$ and Me have the above-stated meaning.

$R^1$ has the following meaning:

$R^1$ may be an alkyl residue, the alkyl residue comprising an optionally substituted linear or branched alkyl residue with 1-20, preferably with 1-12, particularly preferably with 1-6 C atoms. The alkyl residue may be substituted with any desired organic groups, for example, with acid groups, hydroxyl groups and amino groups.

R[1] may likewise be an aryl residue, the aryl residue comprising aromatic hydrocarbon residues such as, for example, phenyl and naphthyl residues.

R[1] may also be an aralkyl residue, the aralkyl residue comprising alkyl residues substituted by aryl groups, such as, benzyl residues, phenylalkyl residues with 1-10 C atoms in the alkyl residue, for example, phenylethyl residues. The alkyl residues may here also be substituted in the above-stated manner.

The residues R[1] in the general formula I and II preferably comprise identical residues R[1] in one formula, but combinations of different residues R[1] in one formula may also be present.

R[1] is preferably a lower alkyl residue with 1-6 C atoms, such as, for example, a methyl, ethyl, propyl, isopropyl, butyl, isobutyl, pentyl or hexyl residue.

Zirconium and/or titanium compounds of the general formula I are preferably used.

Preferred compounds of general formula I are tetrapropyl titanate, tetrapropyl zirconate, tetrabutyl titanate, tetrabutyl zirconate, tetrapentyl titanate and tetrapentyl zirconate.

Examples of compounds of general formula II are zirconium and titanium esters of organic acids.

The modification of the nanoparticles with the zirconium and/or titanium compounds of the general formula I and/or II will now be described in greater detail. Both here and below, the above-described zirconium and/or titanium compounds of the general formula I and/or II will be designated compounds of the general formula I and/or II.

One possible production method involves initially introducing the compounds of the general formula I and/or II to be used for modification in one or more organic solvents. Organic solvents which may be used are conventional organic solvents for coatings, such as, for example, glycol ethers, such as, ethylene glycol dimethyl ether; propylene glycol dimethyl ether; glycol ether esters, such as, ethylene glycol monoethyl ether acetate, ethylene glycol monobutyl ether acetate, 3-methoxy-n-butyl acetate, diethylene glycol monobutyl ether acetate, methoxypropyl acetate, esters, such as, butyl acetate, isobutyl acetate, amyl acetate; ketones, such as, methyl ethyl ketone, methyl isobutyl ketone, cyclohexanone, isophorone, aromatic hydrocarbons (for example, with a boiling range of 136-180° C.) and aliphatic hydrocarbons. The compounds of the general formula I and/or II may here be mixed with the organic solvent(s) by stirring, for example, at 10-100° C., in a suitable unit. The nanoparticles or nanoparticle agglomerates may then be sprinkled into the mixture obtained in this manner, preferably with stirring and in small portions. This may proceed for example, at 10-100° C. over a few minutes to several hours.

It is, however, also possible initially to prepare a suspension of the nanoparticles in one or more organic solvents and then to add the compounds of the general formula I and/or II.

The resultant mixture may then be predispersed in a suitable unit, for example, a high-speed mixer, and dispersed down to a desired particle size in a suitable manner, for example, in a bead mill, by means of a jet disperser or by means of ultrasound. Dispersion is performed, for example, down to a primary particle size of 1-200 nm, preferably of 1-70 nm.

The nanoparticles are treated, for example, with 1-60 wt. %, preferably with 1-40 wt. %, most preferred with 1-20 wt. %, of the compounds of the general formula I and/or II, relative to the quantity of nanoparticles. The quantity of compounds of the general formula I and/or II to be used here vitally depends on the selected nanoparticles.

The preparation of the modified nanoparticles in the organic phase as described above is preferably used to prepare nanoparticles modified with compounds of the general formula I.

The nanoparticles based on pyrogenic silica to be used comprise conventional particles known to the person skilled in the art in the "nanometre" size range, for example, with an average primary particle size of 1 to 200 nm, preferably of 1 to 100 nm, which may contain functional groups, in particular hydroxyl groups, on the particle surface. Usable nanoparticles based on pyrogenic silica are obtainable as commercial products, for example, various grades under the name Aerosil® from Degussa, for example, Aerosil® R 90, R 130, R 150, R200, R300, R380, R812, R 9200, R 8200, under the name(s) Cab-O-Sil® LM 150, M-5, PTG, TS-610 and TS-530 from Cabot Corporation and under the name HDK N 20, HDK H 18, HDK T 40 and HDK T 30 from Wacker.

As has already been mentioned above, the nanoparticles to be modified according to the invention may, in a preferred embodiment, already be silanised. On silanisation, a proportion of the OH groups of the silica particles is reacted with appropriate compounds, so rendering the nanoparticles water-repellent. Various options are known for silanisation. For example, the hydroxyl groups of the pyrogenic silica may be reacted with chlorosilanes or also with alkyl (di)silazanes. Another option involves, as described in EP 0 672 731, reacting the hydroxyl groups of the pyrogenic silica with compounds of the general formula $(OR)_3SiC_nH_{2n+1}$, wherein n=10 to 18 and R means an alkyl residue with 1 to 4 C atoms. Such silanised nanoparticles based on pyrogenic silica are likewise commercially obtainable, for example, under the name Aerosil® R 711, R 805, R 972, R 974, R 202, R 812, R 7200, R 8200 and R 9200 from Degussa, HDK H 15, HDK H 18, HDK H 20 and HDK H 30 from Wacker and Cab-O-Sil® TS 610, TS 530 and TS 720 from Cabot Corporation.

In a further preferred embodiment according to the invention, the nanoparticles may be modified with the compounds of the general formula I and/or II in combination with the treatment with silane compounds. The silane compounds may, for example, comprise compounds of the general formula $Si(OR^2)_nR^3_{4-n}$ with n=1, 2, 3 or 4, wherein $R^2$ has the meaning of $R^1$, and $R^3$ represents any desired organic group, which is attached directly to the silicon via a carbon atom. If n is 1 or 2, $R^3$ can be identical or different, if n is 2, 3 or 4 $R^2$ can be identical or different. Preferably silane compounds with n=4 are used, wherein $R^2$ has the above stated meaning and can be identical or different.

Treatment with the silane compounds may proceed in parallel with or preferably after treatment with the compounds of the general formula I and/or II. In any event, such treatment should proceed before the grinding process.

One embodiment according to the invention which is particularly preferred is that in which the obtained modified nanoparticles are additionally incorporated into specific functional compounds and are then jointly predispersed and ground together with these functional compounds. It is assumed that, when the nanoparticles are modified according to the invention with compounds of the general formula I and/or II, not all functional groups of these compounds, e.g., —OR[1] groups, are bound to the surface of the nanoparticles and free groups —OR[1] are still retained. It is further assumed that, with the assistance of these still free groups, the nanoparticles may be bound to specific functional compounds, whether by chemical reaction or coordinative attachment.

The functional compounds comprise mono- and/or polyfunctional monomeric, oligomeric and/or polymeric compounds which contain functional groups which are intended to be capable of binding to those reactive groups, e.g., $OR^1$ groups, of the nanoparticles which are still present. Suitable functional groups which may be considered are any desired organic groups with Lewis basicity, such as, for example, OH, COOH, amino, thiol, carbamate, imido, epoxide, isocyanate and/or ester groups. Correspondingly, functionalised oligomeric or polymeric binders and/or other correspondingly functionalised compounds may be used. For example, hydroxy-functional or carboxy-functional binders and/or other hydroxy- or carboxy-functional compounds, for example, mono- or polyhydric longer-chain linear or branched alcohols, for example, mono- or polyhydric aliphatic alcohols with 5 to 20 C atoms may be used.

Functionalised compounds which may particularly advantageously be used are such correspondingly functionalised binders, for example, hydroxy-functional binders, which are also a constituent or preferably the main constituent of the coating binder system into which the modified nanoparticles are to be incorporated. Stable masterbatches containing nanoparticles are obtained, which may be directly incorporated into a coating system without any problems. Improved deagglomeration and thus dispersion of the nanoparticles in the coating system is obtained.

The nanoparticle masterbatches may, for example, be produced by mixing and predispersing the modified nanoparticles with the functionalised compounds, in particular the functionalised binders, in a high-speed mixer and then continuing dispersing in suitable units, for example, by means of a bead mill. The functionalised compounds, in particular the functionalised binders, may here initially be introduced and the modified nanoparticles added thereto or the modified nanoparticles may initially be introduced and the functionalised compounds, in particular the functionalised binders, added thereto. At variance with these variants, it is, however, also possible, to perform the treatment/modification according to the invention of the nanoparticles with the compounds of the general formula I and/or II in the presence of the functionalised compounds. The functionalised compounds can be present as organic solution or organic dispersion.

The nanoparticles and the functionalised compounds, in particular, the functionalised binders, may here be used in a ratio by weight of functionalised compound: modified nanoparticles of 99:1, preferably of 80:20 as an upper limit. The lower limit of the ratio by weight may be considered to be the ratio by weight of functionalised compound: modified nanoparticles corresponding to the critical pigment volume concentration (CPVC), i.e., the quantity of functionalised compound which is just sufficient adequately to wet a specific quantity of nanoparticles. It may, for example, comprise a ratio by weight of functionalised compound: modified nanoparticles of 80:20 to 3:20.

Ideally, the functionalised compounds, in particular the functionalised binders, are here used in a quantity and the conditions selected such that as far as possible all the reactive groups still present on the nanoparticle surface may be consumed by reaction with the corresponding functional groups of the binder. Any unreacted functional groups of the binder which are optionally still present may then, in the presence of an appropriate crosslinking agent in the coating composition, react with the reactive groups of the crosslinking agent and so participate in the crosslinking process.

Dispersion of the nanoparticle masterbatches proceeds down to a desired particle size of for example, 1-200 nm, preferably 1-70 nm.

In the absence of water, the resultant nanoparticle masterbatches exhibit excellent storage stability within a wide temperature range, for example, from −15 to 80° C.

Self-evidently, all the above-described embodiments according to the invention may be used alone or combined with one another in any desired manner.

The present invention also relates to a process for the production of modified nanoparticles, comprising the following steps:

I) providing nanoparticles based on pyrogenic silica, in particular silanised pyrogenic silica, II) treating the pyrogenic silica, in particular the silanised pyrogenic silica, with compounds of the general formula I $Me(OR^1)_4$ and/or of the general formula II $Me(OCOR^1)_4$, wherein $R^1$ means an alkyl, aryl and/or aralkyl residue and Me means zirconium and/or titanium, III) optionally, treating the pyrogenic silica, in particular the already silanised pyrogenic silica, with silane compounds of the general formula $Si(OR^2)_n R^3_{4-n}$ with n=1, 2, 3 or 4, wherein $R^2$ has the meaning of $R^1$, and $R^3$ is any desired organic group, which is attached directly to the silicon atom via a carbon atom, jointly with the treatment in step II or after the treatment in step II and IV) optionally, incorporating the nanoparticles into functional monomeric, oligomeric and/or polymeric compounds, which contain functional groups with Lewis basicity, wherein modified nanoparticles obtained in step II or III may be incorporated into the functional compounds or wherein modification of the starting nanoparticles proceeds in step II and/or III in the presence of the functional compounds.

The functionalised compounds and the functional groups comprise those already stated above.

The present invention also relates to coating compositions which contain the above-described modified nanoparticles. In particular, the invention relates to coating compositions modified with nanoparticles, comprising A) at least one film-forming binder, B) optionally, at least one crosslinking agent for the binder, C) 0.5-40 wt. %, preferably 1-20 wt. %, relative to the quantity of film-forming binder A), of nanoparticles based on pyrogenic silica which are produced by treating pyrogenic silica with compounds of the general formula I $Me(OR^1)_4$ and/or of the general formula II $Me(OCOR^1)_4$, wherein R' means an alkyl, aryl and/or aralkyl residue and Me means zirconium and/or titanium, and D) optionally, organic solvents, water, pigments and fillers and conventional coating additives.

Selection of the film-forming binders A) and optionally present crosslinking agents B) in the coating compositions according to the invention is not subject to any particular restriction. Any desired binders conventionally usable in coatings production may be used. The binders A) may comprise, for example, polyesters, polyurethanes, (meth)acrylic copolymers, epoxy resins and mixtures as well as hybrids of the stated binders. The listing is, however, not intended to constitute a limitation. Polymers other than those stated may also be used. The binders A) may comprise functional groups. When functional groups are present, the binders preferably have at least two functional groups per molecule.

Non-limiting examples of functional groups which may be present in the binders A) are epoxy groups, carboxyl groups, hydroxyl groups, amino groups, isocyanate groups, olefinically unsaturated groups, alkoxysilane groups. The functional groups may here also be present in blocked form, for example, as blocked hydroxyl groups, isocyanate groups or amino groups.

Production of the optionally functionalised binders A) is sufficiently known to the person skilled in the art and requires no explanation.

The binders A) may be self- or externally crosslinking. They may, however, also comprise physically drying binders.

In addition to the binders A), the coating compositions according to the invention may contain crosslinking agents B) which are capable of entering into a crosslinking reaction with functional groups of the binders A).

Selection of the crosslinking agents is guided by the functional groups present in the binders A), i.e., the crosslinking agents are selected such that they exhibit a reactive functionality complementary to the functionality of the binders, wherein the functional groups may react with one another by free-radical polymerisation and/or by addition and/or condensation.

Examples of addition reactions between binders A) and crosslinking agents B) are the ring-opening addition of an epoxy group onto a carboxyl group with formation of an ester group and a hydroxyl group, the addition of a hydroxyl and/or primary and/or secondary amino group onto an isocyanate group with formation of a urethane group and/or urea group, the addition of a primary and/or secondary amino group and/or CH-acidic group onto an alpha, beta-unsaturated carbonyl group, in particular (meth)acryloyl group, the addition of a primary and/or secondary amino group onto an epoxy group. Examples of condensation reactions between (A) and (B) groups are the reaction of a hydroxyl and/or primary and/or secondary amino group with a blocked isocyanate group with formation of a urethane group and/or urea group and elimination of the blocking agent, the reaction of a hydroxyl group with an n-methylol group with elimination of water, the reaction of a hydroxyl group with an n-methylol ether group with elimination of the etherification alcohol, the transesterification reaction of a hydroxyl group with an ester group with elimination of the esterification alcohol, the transurethanisation reaction of a hydroxyl group with a carbamate group with elimination of alcohol, the reaction of a carbamate group with an n-methylol ether group with elimination of the etherification alcohol. Examples of functional groups (A) and (B) capable of reacting by means of free-radical polymerisation are olefinically unsaturated groups, for example, vinyl groups, allyl groups, in particular (meth)acryloyl groups.

Providing that they are mutually compatible, two or more complementary functionalities may simultaneously be present in a binder curable by addition and/or condensation reactions, such that curing may proceed via two or more different reactions of the types stated above by way of example.

The coating compositions according to the invention contain 0.5-40 wt. %, preferably 1-20 wt. %, relative to the quantity of film-forming binder A), of the above-described modified nanoparticles based on pyrogenic silica. All the previously described possible embodiments of the nanoparticles are, of course, also included.

The modified nanoparticles may additionally, as already explained above, particularly preferably be incorporated into functionalised compounds. It is particularly advantageous here, as has also already been explained above, to use as the functionalised compounds correspondingly functionalised binders, for example, hydroxy-functional binders, which are also a constituent or preferably the main constituent of the binder system of the coating composition. Functionalised binders which may accordingly be considered in principle are also those which have already been described above for use in the coating compositions.

The nanoparticle masterbatches may here be produced directly during base formulation of the coating composition and be incorporated into the coating composition, but they may, however, also be produced and stored as semifinished products and then incorporated into finished coating compositions when required. Generally, the modified nanoparticles can be incorporated into the coating compositions as such or in the form of the above described masterbatches. Preferably, the nanoparticles and nanoparticle masterbatches are prepared in the organic phase, as described above, and then incorporated in a suitable manner into waterbased or solvent-based coating compositions, The coating compositions according to the invention may contain pigments and/or fillers and conventional coating additives in conventional coating quantities.

The coating compositions according to the invention may contain conventional coating organic solvents and/or water. Aqueous coating compositions may, for example, assume emulsion form. The emulsified state may here be achieved by the addition of external emulsifiers or the systems may contain groups having a self-emulsifying action in water, for example, ionic groups.

The coating compositions according to the invention may be formulated as one- or two-component coating systems, depending on the binders and crosslinking agents selected. Preferred examples of one- or two-component coating compositions are those which contain hydroxy-functional binders, such as, hydroxy-functional (meth)acrylic copolymers, polyester resins and/or polyurethane resins as binder and, as crosslinking agents, triazine-based components, for example, tris(alkoxycarbonylamino)triazine, which crosslink with the hydroxyl groups of the binders to form ether and/or ester groups, amino resins, in particular, melamine resins, and/or transesterification crosslinking agents and/or free or blocked polyisocyanates. Further preferred one- or two-component coating systems are those which contain epoxy-functional binders in combination with carboxy-functional crosslinking agents.

The coating compositions according to the invention may be used in single layer and multilayer coatings. When used in multilayer coatings, they are preferably used for the production of the external coating layer of a multilayer structure. The external coating layer may comprise pigmented or unpigmented coating layers, which are produced, for example, from a pigmented top coat, a clear coat or a sealing coat.

The coating compositions may be applied by conventional application methods onto any desired substrates, for example, of metal, plastics, wood or glass. Examples of application methods are brushing, roller application, knife coating, dipping, but in particular spraying. After application, the coating layers applied from the coating compositions according to the invention are dried or cured after an optional flash-off phase. Depending on the composition of the coating compositions according to the invention, drying/curing may proceed at room temperature or be forced at elevated temperatures, for example, 40 to 80° C., or by stoving (baking) at higher temperatures, for example, 80 to 220° C. In the case of radiation-curable coating compositions according to the invention, curing proceeds by exposure to high-energy radiation, for example, UV radiation.

The nanoparticles according to the invention, in particular the nanoparticles incorporated into functionalised compounds, such as, functionalised binders, in the form of nanoparticle masterbatches, exhibit no compatibility problems between the nanoparticles and further binder or coating composition constituents, whether during production, storage or during or after the incorporation thereof into coating compositions or during or after application of the coating compositions. It has proved possible to achieve an improvement in the dispersion and deagglomeration of the nanoparticles. The masterbatches and coating compositions containing the nanoparticles are stable in storage. Thanks to the use of specific compounds of the general formula I and/or II for modifying the nanoparticles, it has proved possible to minimise the risk of secondary or competitive reactions of the nanoparticles modified according to the invention with one another, for example, before incorporation into the stated functionalised compounds, and/or with the binders and/or other coating components. The coating layers applied from the coating compositions according to the invention have for example, very good surface qualities, in particular for example, elevated scratch resistance and chemical resistance. These advantageous properties may be achieved without having to accept impairment of other important properties of the coating composition or of the coatings obtained therefrom, such as, for example, colour matching, transparency, rheological properties, flow, adhesion and development of hardness.

The nanoparticles according to the invention or coating compositions containing them may be used in any application where high quality coatings with good mechanical resistance, in particular elevated scratch resistance, are required. They may accordingly in particular be used in vehicle and industrial coating.

The invention will be further described by reference to the following examples.

EXAMPLES

Example 1

Determining the Optimal Amount of Ti(OPr)$_4$ for Modifying Pyrogenic Silica Nano-Particles HDK® T30 from Wacker has been used as pyrogenic silica nano-particles. HDK® T30 is a synthetic, hydrophilic amorphous silica, produced via flame hydrolysis.

5 g of HDK® T30 were stirred in a beaker with 100 g butylacetate and 2.55 g Ti(OPr)$_4$ (98%, 2.55 g. 8.83 mmol, from Aldrich). After 10 min of stirring with a Dispermat at 200-2000 rpm the silica was filtered off by a commercially available 0.45 µm filter (Millex-LCR, Millipore). The filtrate was investigated on excess of Ti(OPr)$_4$ by AAS (Atom Absorptions Spectroscopy).

The amount of titanate to modify the surface of the silica was investigated as 35.3% by weight on silica.

Pr=Propyl

Preparation of Titanate Modified Pyrogenic Silica Paste 35.7 g (98%, 35.7 g 0.123 mol) Ti(OPr)$_4$ were added to 371.0 g of a usual hydroxy-functional polyester binder (P) while stirring with a Dispermat at 100 rpm. 99.1 g HDK® T30 were added to the solution together with 300 g butylacetate. The mixture was stirred for 10 min at 100-1000 rpm.

The grinding process was done in a PM1 pear mill (Drais) with 1300 g of 1 mm SAZ pearls (Garbe, Lahmeyer & Co. AG) at 2800 rpm at 60° C. After 3 h the modified silica containing paste was obtained.

(P): 70 wt-% solution of a polyester polyol composed of neopentyl glycol, trimethylolpropane, hexahydrophtalic anhydride and coconut fatty acid, with an acid value of 13 mg KOH/g and a hydroxyl value of 136 mg KOH/g, a calculated hydroxyl functionality of 3.8 and a calculated molecular mass of 1500 in Solvesso® 100.

Comparative Example 1

Preparation of an Unmodified Pyrogenic Silica Paste 470.6 g of a the hydroxy-functional polyester binder above were mixed with 71.3 g butylacetate and 58.14 g of HDK® T30. The mixing and grinding procedure was done under the same conditions as for the modified pyrogenic silica paste in Example 1.

Example 2

Preparation of a Clear Coat Containing the Modified Silica Paste and Comparative Clear Coat Containing the Unmodified Silica Paste The titanate modified silica paste of Example 1 was incorporated into a usual 2K solvent-based polyester clear coat in such amounts, that a content of modified silica particles of 10% is achieved, based on solid binder in the clear coat. The base clear coat was prepared by mixing the following ingredients:

| | |
|---|---|
| Hydroxy-functional polyester (P) | 70 |
| Light stabilizer of the HALS type | 1.4 |
| UV absorber based on benztriazole | 1.4 |
| Commercial levelling agent (silicone oil) | 0.5 |
| Ethoxypropyl acetate | 9 |
| Butyl diglycol acetate | 1 |
| Solvesso ® 100 | 10.2 |
| Solvesso ® 150 | 2 |
| Butyl acetate | 4.5 |

Accordingly the unmodified silica paste of Comparative Example 1 was incorporated into the base clear coat in such amounts that a content of silica particles of 10% is achieved, based on solid binder in the clear coat.

The so obtained clear coat and the comparative clear coat (P) were mixed each with the following hardener solution in amounts that an equivalent ratio of OH:NCO of 1:1.2 results.

Hardener Solution: Mixture of 81 g of hexamethylene diisocyanate isocyanurate (Desmodur 3390; Bayer), 9.5 g of Solvesso® 100 and 9.5 g of butyl acetate The clear coat and the comparative clear coat compositions obtained by mixing were then applied by electrostatic spraying in a dry layer thickness of 35 µm to test panels provided with an aqueous base coat layer of a usual black waterborne base coat (Base coat Brilliant Black of DuPont). After a 15 minute flash-off at room temperature, the clear coat coating layer was baked for 25 minutes at 140° C. (object temperature).

Results

Table 1 gives results of technological tests carried out on the coatings.

TABLE 1

Technological results

| | | Clear coat according to invention | Comparative Clear Coat |
|---|---|---|---|
| Appearance | Gloss (20°) | 85 | 83 |
| | Haze | 10 | 13 |
| Hardness | Fischer hardness (N/mm$^2$) | 129 | 127 |
| Amtec (Amtec Kistler GmbH) | Initial gloss | 85 | 83 |
| | Gloss after strain | 51 | 42 |
| | Gloss after reflow | 76.9 | 61.4 |

As can be seen in Table 1 gloss and haze values of the modified silica nanoparticle containing clear coat are superior to the comparative clear coat containing unmodified silica. Also technological values such as Amtec test results are improved by using surface modified silica particles. In particular remarkably improved results have been achieved with regard to gloss after strain and after reflow.

Test Methods:

Haze and Gloss values measured by Micro-Haze plus (Byk-Gardner) according to DIN 67530 (Gloss) and DIN EN ISO 13803 (Haze)

Fischer hardness measured by Fischerscope H 100 (Fischer GmbH und CO.KG) according to DIN EN ISO 14577-1

Amtec: according to DIN 55668; Scratching was carried out using the laboratory-scale Amtec Kistler car wash (cf. Th. Klimmasch and Th. Engbert, Development of a uniform laboratory test method for assessing the car wash resistance of automotive top coats, in DFO Proceedings 32, pages 59 to 66, Technologie-Tage, Proceedings of the Seminar on 29. and 30.4.97 in Cologne, Published by Deutsche Forschungsgesellschaft für Oberflächenbehandlung e.V., Adersstraße 94, 40215 Düsseldorf.

The residual gloss in % was measured in each case directly after strain and after one hour's reflow at an angle of illumination of 20°.

What is claimed is:

1. Functionalized nanoparticles comprising modified silica nanoparticles comprising pyrogenic silica treated with compounds of the general formula I Me(OR$^1$)$_4$ and/or of the general formula II Me(OCOR$^1$)$_4$; wherein R$^1$ is an alkyl, aryl and/or aralkyl residue and Me is zirconium and/or titanium, said modified silica nanoparticles being incorporated into mono- and/or polyfunctional monomeric, oligomeric and/or polymeric compounds.

2. Functionalized nanoparticles according to claim 1, wherein R$^1$ is a residue selected from a group consisting of optionally substituted linear or branched alkyl residue with 1-20 C atoms, phenyl residue, naphthyl residue, benzyl residue and phenylalkyl residue with 1-10 C atoms in the alkyl residue.

3. Functionalized nanoparticles according to claim 1, wherein R$^1$ is an alkyl residue with 1-6 C atoms.

4. Functionalized nanoparticles according to claim 1, wherein silanised pyrogenic silica is used.

5. Functionalized nanoparticles according to claim 1, wherein treatment of the nanoparticles with the compounds of the general formula I and/or II proceeds in combination with the treatment with silane compounds of the general formula Si(OR$^2$)$_n$ R$^3{}_{4-n}$, wherein n =1, 2, 3 or 4, wherein R$^2$ has the meaning of R$^1$ and R$^3$ represents any desired organic group which is attached directly to the silicon via a carbon atom.

6. Functionalized nanoparticles according to claim 1, wherein the modified nanoparticles are produced by treating pyrogenic silica with 1-60 wt.-% of compounds of the general formula I and/or II, relative to the quantity of the nanoparticles.

7. Functionalized nanoparticles according to claim 1, wherein the modified silica nanoparticles are incorporated into hydroxy-functional and/or carboxy-functional binders and/or other hydroxy- or carboxy-functional compounds.

8. A coating composition comprising the functionalized modified nanoparticles according to claim 1.

9. A coating composition according to claim 8 comprising the following components:
   A) at least one film-forming binder,
   B) optionally, at least one crosslinking agent for the binder,
   C) 0.5-40 wt.%, relative to the quantity of film-forming binder A), of functionalized nanoparticles according to claim 1, and
   D) optionally, organic solvents, water, pigments, fillers and/or conventional coating additives.

10. A coating composition according to claim 9, comprising 1-20 wt.% of the functionalized nanoparticles C), relative to the quantity of film-forming binder A).

11. A coating composition according to claim 8, wherein it comprises a transparent clear coat or a pigmented coat.

* * * * *